H. E. DELL.
INCUBATOR.
APPLICATION FILED JAN. 7, 1914.

1,145,570.

Patented July 6, 1915.
4 SHEETS—SHEET 1.

Witnesses
M. S. Watson

Inventor
H. E. Dell
By Chandler & Chandler
Attorneys

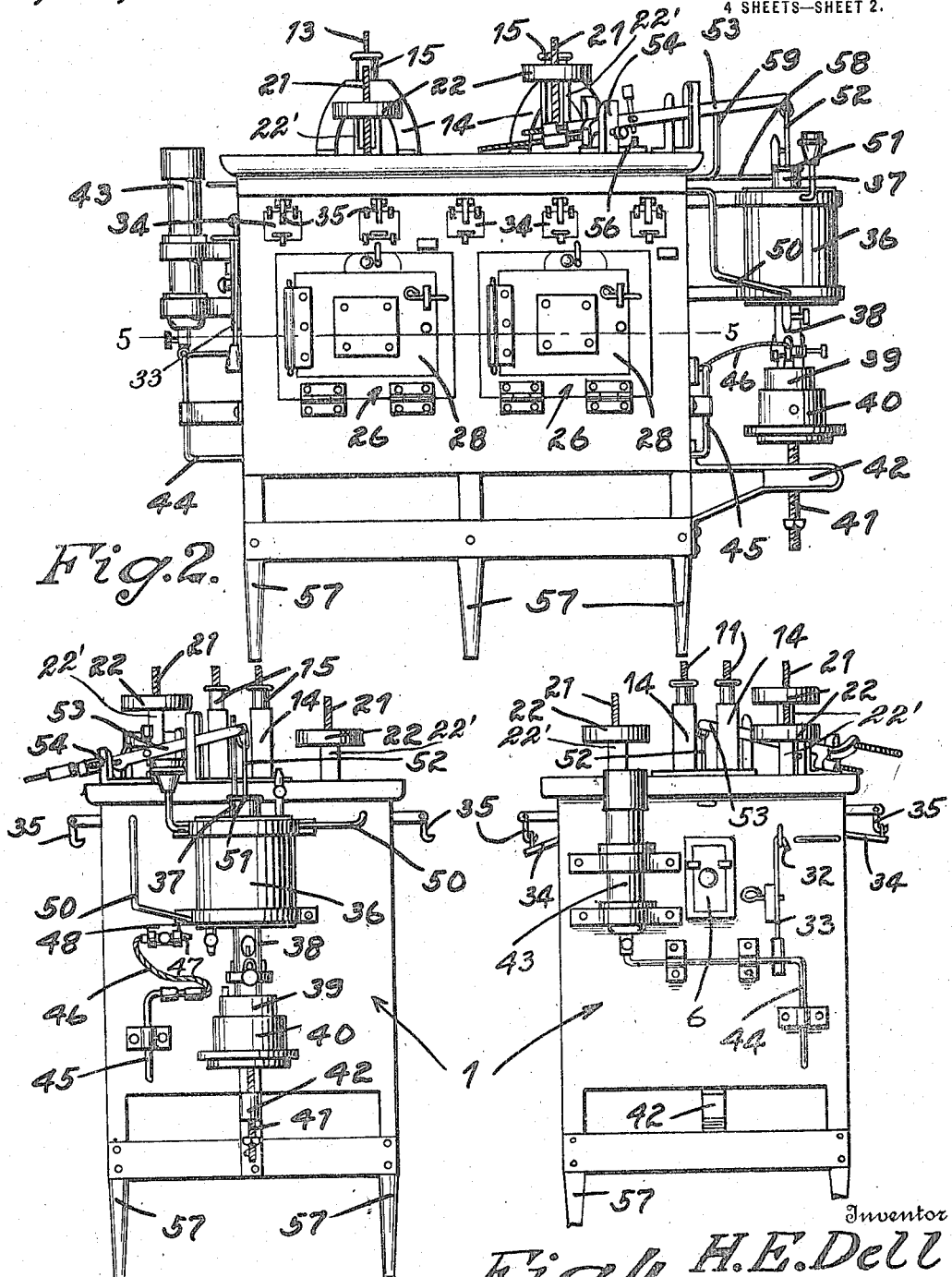

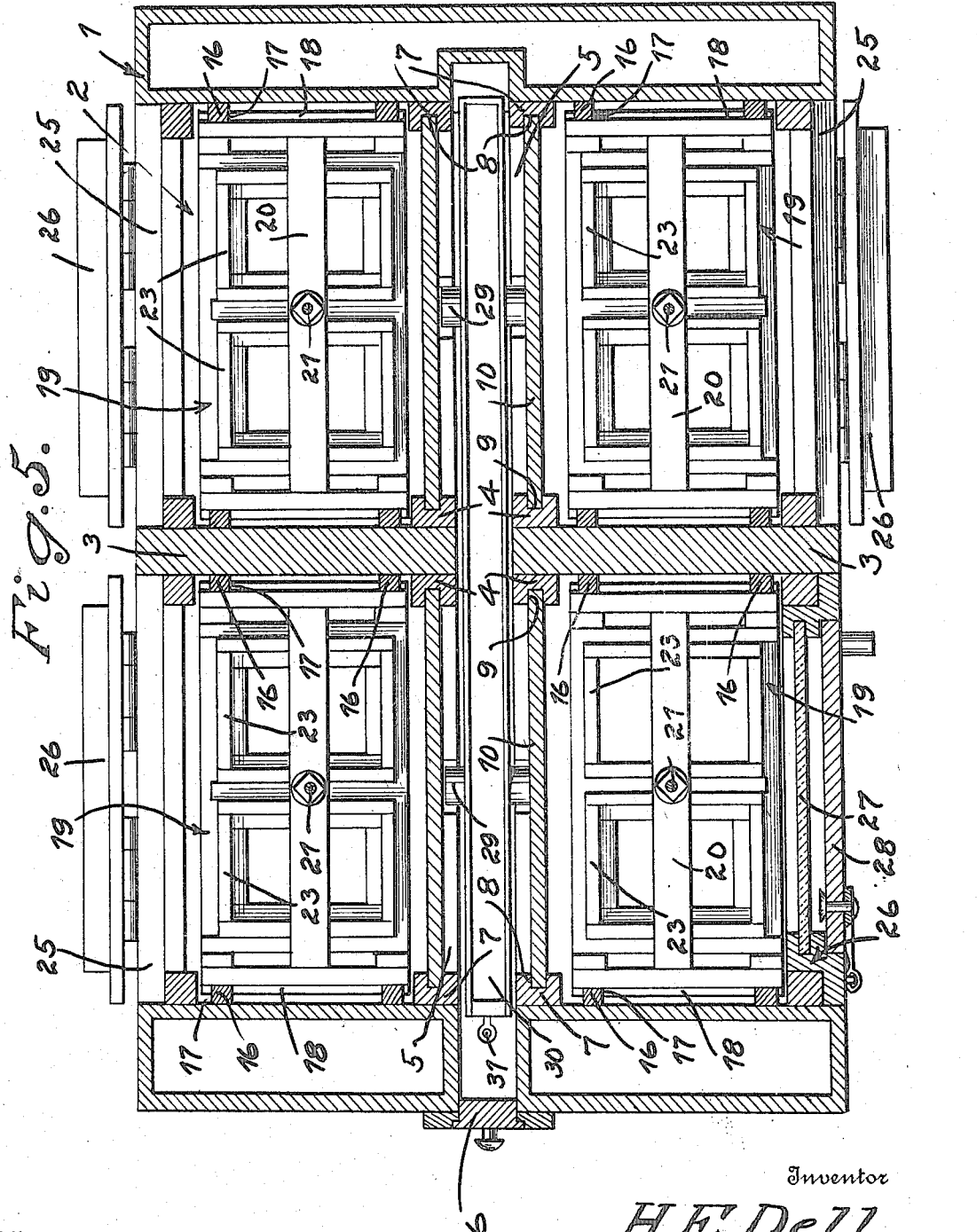

UNITED STATES PATENT OFFICE.

HORACE E. DELL, OF SPRING LAKE, MICHIGAN.

INCUBATOR.

1,145,570.

Specification of Letters Patent.     Patented July 6, 1915.

Application filed January 7, 1914. Serial No. 810,867.

*To all whom it may concern:*

Be it known that I, HORACE E. DELL, a citizen of United States, residing at Spring Lake, in the county of Ottawa, State of Michigan, have invented certain new and useful Improvements in Incubators; and I do hereby declare the following to be a full, clear, and exact description of the invention, such as will enable others skilled in the art to which it appertains to make and use the same.

The present invention is directed to new and useful improvements in incubators.

An object of the invention resides in so constructing the device that the air therein will be kept moist.

A further object of the invention resides in the provision of moistening means which may be regulated so as to be effective in only certain of the compartments of the incubator or all of the compartments, as desired.

With these and other objects in view, this invention resides in the novel features of construction, formation, combination and arrangement of parts to be hereinafter more fully described, claimed and illustrated in the accompanying drawing, in which:—

Figure 1:
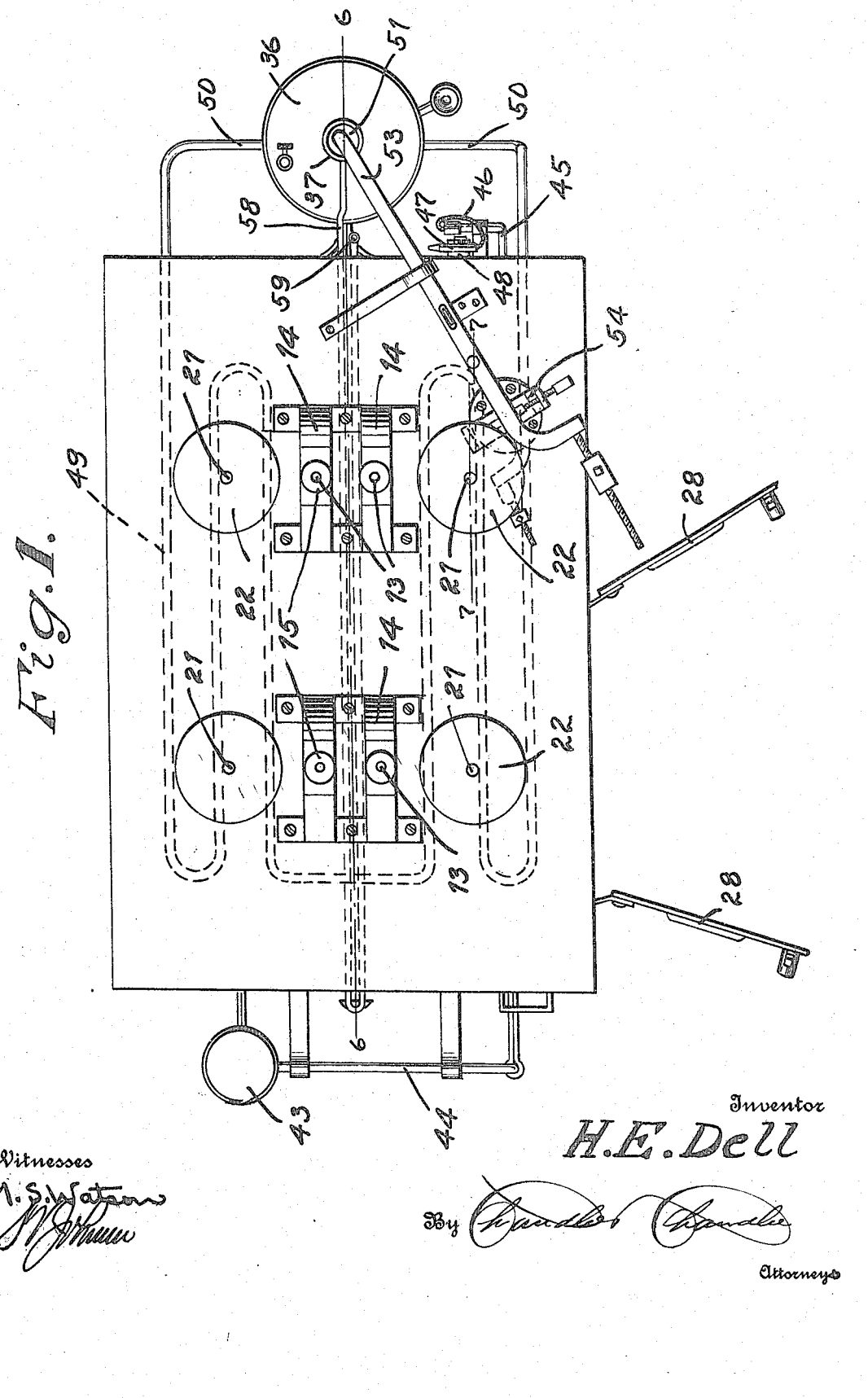
Figure 6:
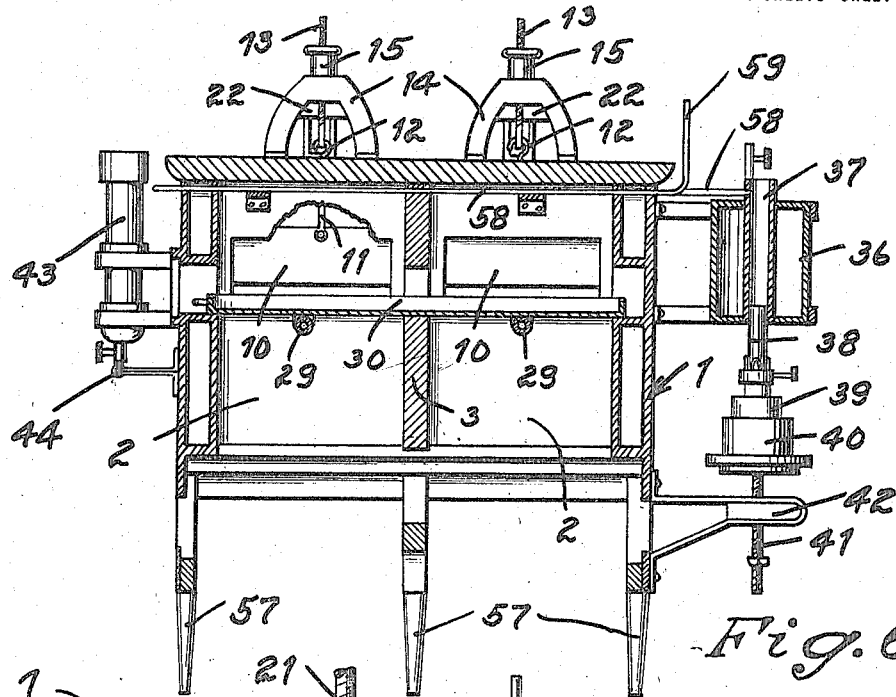
Figure 7:
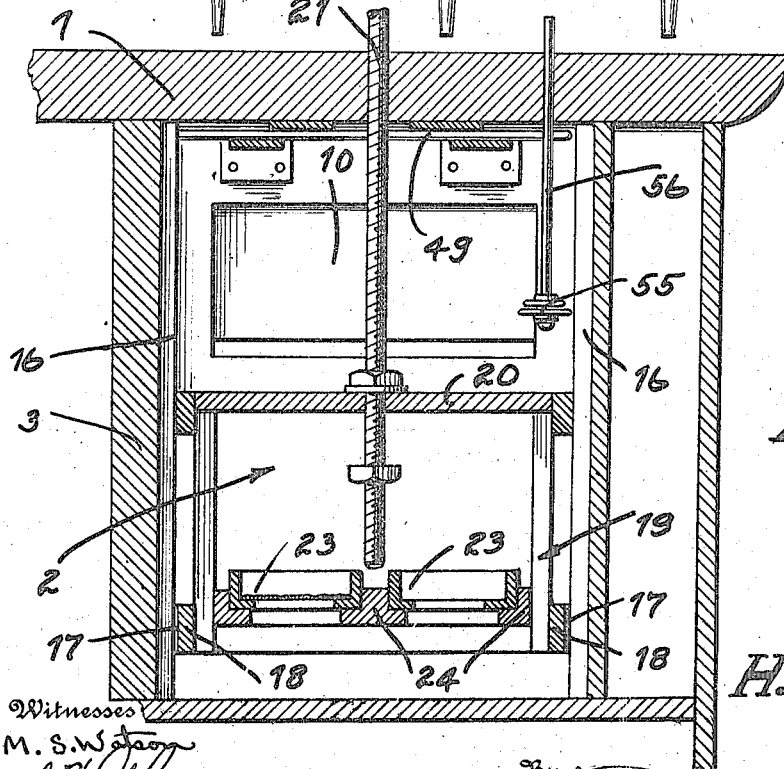

Figure 1 is a top plan view of the device. Fig. 2 is a side elevation. Fig. 3 is an end view. Fig. 4 is a view of the opposite end. Fig. 5 is a sectional view on line 5—5 of Fig. 2. Fig. 6 is a similar view on line 6—6 of Fig. 1. Fig. 7 is a similar view on line 7—7 of Fig. 1.

The body 1 is divided into compartments 2, preferably four in number, said compartments being formed by transverse partitions 3, the inner ends of which are spaced apart and are secured in the posts 4.

The compartments 2 are arranged in pairs and spaced apart by the longitudinal chamber 5 which has one end opening at one of the ends of the body 1, the open end of said chamber being normally closed by the door 6.

Alined with the posts 4 are posts 7, which are provided with vertical grooves 8 which correspond with the similar grooves 9 formed in the posts 4, said grooves being slidably engaged by the doors 10 which are engaged by the lower ends of the rods 11, said rods being passed through the top of the body and terminate in hooks 12, said hooks being engaged by the lower ends of the rods 13, which are passed through the supports 14 and have their threaded ends engaged by the nuts 15. As the nuts 15 bear against the supports 14 it is obvious that upon manipulation of said nuts the doors 10 may be raised or lowered, or may be adjusted to partially open positions so that the passage of warm air may be regulated from compartment to compartment.

Each compartment 2 has its end walls provided with guide strips 16 which engage the grooves 17 formed in the end bars 18 of the tray elevators 19. The top bars 20 of the elevators are engaged by the lower ends of the screw rods 21, the upper ends of which project above the top of the body 1 and are engaged by the hand wheels 22 which rest upon the bearings 22′ and which when rotated will move the rods 21 vertically, thus raising or lowering the tray elevators 19 so that the same may be adjusted in the compartments 2 to subject the eggs in the trays 23 to different degrees of heat, as desired.

The egg trays 23 are slidably engaged in the guides 24 carried by the elevators 19, whereby said trays may be readily removed and replaced.

The sides of the compartments are provided with door openings 25, said openings being closed by the doors 26 which have their bottom edges hingedly connected to the sides of the body 1. The doors 26 are provided with glass panels 27, so that the process of incubation may be noted without opening the doors 26. To prevent light entering the compartments 2 each door is provided with shutters 28, which are hingedly connected to said doors.

Mounted in the longitudinal chamber 5 are rollers 29 which support the trough 30, said trough being for the purpose of containing sand and water so that the proper moisture may be supplied to the compartments 2, it being of course understood that the sliding doors 10 are adjusted to permit the warm air to circulate over the trough 30. The trough is provided with an eye 31 which is engaged by the hook 32 formed upon the handle 33, said handle being conveniently mounted upon one end of the body 1, as shown in Fig. 4 of the drawing. To remove the trough it is only necessary to remove the door 6 so that the handle can be engaged with the eye 31 of said trough, whereupon the same may be slid from the longitudinal chamber 5 with ease, as the same rests upon the rollers 29.

The side walls of the body 1 are provided at their upper ends with hingedly connected ventilating doors 34, which may be held in their open positions by the hooks 35 which are connected to the side walls of the said body, and as clearly shown in Fig. 4 of the drawing.

Supported upon one end of the body 1 is a water tank 36, and passing through said tank is a vertical flue 37 in the lower end of which is engaged the chimney 38 of the lamp 39, said lamp being engaged in the receptacle 40. The base of the receptacle 40 has depending therefrom a screw rod 41 which is threaded through the bracket 42 so that the receptacle may be rotated and lowered, thereby permitting the chimney 38 to disengage the flue 37 so that the lamp may be removed.

An oil tank 43 is mounted upon the end of the body 1 opposite the tank 36 and has leading therefrom a feed pipe 44, which passes through the bottom of the body 1 and is directed upwardly, as at 45. The upwardly directed end of the pipe has attached thereto a rubber tube 46, which is provided with a nozzle 47 so that the lamp may be filled without removing the same from the receptacle. The nozzle 47 is provided with a valve so that the supply of oil may be shut off and the nozzle placed on the bracket 48, which is fixed to one end of the body, as clearly shown in Fig. 3 of the drawing.

A heating coil 49 is arranged in the upper end of the body 1 so that the same will equally distribute the heat to the compartments 2, said coil having its ends 50 connected to the tank 36 so that a constant circulation of water will be had in the coil, the temperature of the water being regulated by the disk valve 51 which coacts with the tube 37, thus regulating the draft in said tube, as is the usual practice. The disk valve 51 is pivotally connected to the lower end of the rod 52, the upper end of which is similarly connected to one end of the lever 53, said lever being pivotally supported by the bracket 54 mounted upon the upper part of the body 1.

Mounted in one of the compartments 2 is a thermostat 55, the actuating rod 56 thereof having its upper end engaging the lever 53 so as the temperature varies in the compartment the lever will be rocked to regulate the draft through the flue 37. The thermostat 55 may be of any standard construction as desired.

The body 1 is supported by the legs 57, which may be braced in any suitable manner.

To prevent the lamp from becoming extinguished should the disk valve 51 close the upper end of the flue 37, a reversely bent pipe 58 is provided and extends through the body 1, and on a level with the coil 49, said pipe having one end connected to the upper end of the flue 37 and the other end bent upwardly, as at 59, so that a sufficient draft will be had to keep the lamp burning.

What is claimed is:—

1. In an incubator, the combination with a body, said body being divided into a plurality of compartments, a longitudinal chamber separating the compartments into pairs, a moisture producing trough removably mounted in the chamber, and means for regulating the passage of moisture from the chamber to each compartment independently.

2. In an incubator, the combination with a body, said body being divided into compartments, a longitudinal chamber separating the compartments into pairs, a moisture trough removably mounted in the chamber, egg trays in the compartments, doors arranged between the opposing sides of the compartments, means for raising or lowering the doors to regulate the passage of moistened air from the chamber to the compartments independently.

In testimony whereof, I affix my signature, in the presence of two witnesses.

HORACE E. DELL.

Witnesses:
OREN D. WHITE,
CLAUDE E. BARR.

Copies of this patent may be obtained for five cents each, by addressing the "Commissioner of Patents, Washington, D. C."